United States Patent [19]

Takemoto

[11] Patent Number: 4,507,594
[45] Date of Patent: Mar. 26, 1985

[54] DC SERVOMOTOR POSITION CONTROL
[75] Inventor: Akira Takemoto, Osaka, Japan
[73] Assignee: Sumitomo Electric Industries, Ltd., Osaka, Japan
[21] Appl. No.: 523,432
[22] Filed: Aug. 16, 1983
[30] Foreign Application Priority Data
Aug. 17, 1982 [JP] Japan .................. 57-143124
[51] Int. Cl.³ .................................................. G05B 13/00
[52] U.S. Cl. .................................... 318/615; 318/561; 318/284; 318/266
[58] Field of Search ............... 318/561, 615, 284, 266
[56] References Cited
U.S. PATENT DOCUMENTS
4,338,552 7/1982 Pilz et al. ............................ 318/266
4,338,555 7/1982 Rhodes ................................ 318/561

*Primary Examiner*—William M. Shoop
*Assistant Examiner*—Saul M. Bergmann
*Attorney, Agent, or Firm*—Cushman, Darby & Cushman

[57] ABSTRACT

An apparatus and method for position control by a DC servomotor having improved stiffness. An electric current ($i_R$) of the servomotor is interpreted anew and defined as follows:

$$i_R = f\left( K_F(\theta - \theta_c) - K_V \cdot \frac{d\theta}{dt} \cdot \left| \frac{d\theta}{dt} \right| \right)$$

where $\theta$ is an observed rotation angle of the load (L), $\theta_c$ is a precommanded value, $K_F$ is a feedback coefficient, and $K_V$ is a velocity coefficient. After normalizing the above equation, stiffness (S) can be increased by incorporating a limiter into the control system, thus providing prompt response and smooth convergence of $\theta$ to $\theta_c$ with a high degree of stiffness maintained at the precommanded angle ($\theta_c$).

2 Claims, 9 Drawing Figures

DC SERVOMOTOR POSITION CONTROL

BACKGROUND OF THE INVENTION

The invention is generally directed to servomechanical control. In particular, the present invention provides an arrangement for enhancing the degree of stiffness (S) of a servo-mechanical control.

DC servomotors are widely used in the field of automated equipment such as industrial robots, numerically controlled fabrication machines, and intelligent printers or plotters. In these applications, loads operated by the motor (for instance, the hand architecture of robots cutting or drilling tools, printer heads of office terminals, and rollers or press machines) should be held at a predetermined position after movement from the preceding position within a short period of time. It becomes necessary to control the amount of electric current supplied to the servomotor by continuously detecting the position of the load and its moving velocity. For this purpose, a servomotor with high degree or responsiveness to commands and with capability to move promptly and to stop precisely is necessary. In normal practice, current to the rotor is controlled for this purpose. The present invention provides a control arrangement utilizing a small-sized motor achieving high degree of stiffness.

Figure 1:
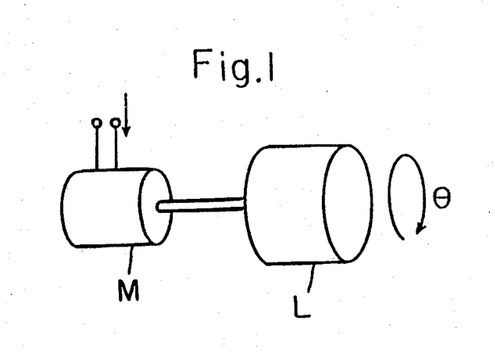
FIG. 1 is a schematic view of a servomotor (M) linked to a load (L).

In FIG. 1, a DC servomotor (M) is mechanically linked to drive a load (L). A motive force of rotation is produced by supplying electric current to a rotor of the motor located in a magnetic field. The torque of the motor $t_L$ is proportional to the rotor current ($i_R$) and, therefore, expressed as in equation 1:

$$t_L = K_T i_R \qquad (1)$$

where $K_T$ is the ratio of torque to rotor current which is constant for a given motor.

When the moment of inertia of the load around the loading axis of the motor is $J_M$, the relation between the angle ($\theta$) of the load around the loading axis and time (t) is expressed in the following equation of motion:

$$\frac{d^2\theta}{dt^2} = \frac{t_L}{J_M + J_L} = \frac{K_T}{J} \cdot i_R \qquad (2)$$

where $$J = J_M + J_L. \qquad (3)$$

From equation 2 it is understood that the rotation angle ($\theta$) can be controlled by varying the current ($i_R$) in the rotor of the DC servomotor (M). In the practical application of the motor with $i_R$ control, there are many methods for determining the value of $i_R$ necessary for rotating the load to the target angle ($\theta_c$). A commonly used method of control is shown in FIG. 2.

Figure 2:
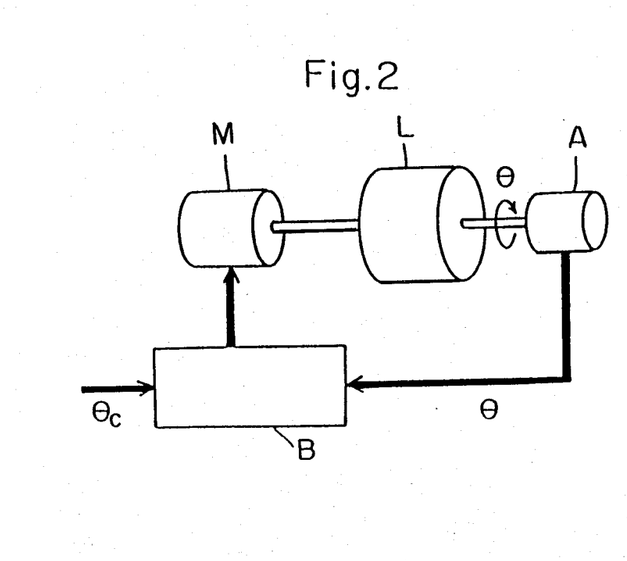
FIG. 2 is a block diagram of a commonly used control system with a servo-drive circuit (B).

Referring now to FIG. 2, motor (M) is mechanically linked to drive a load (L). An angle detector (A) determines the angular position $\theta$ of the load with respect to a three-dimensional coordinate axis of x, y and z (not shown). A servo-drive circuit (B) determines the rotor current ($i_R$) by comparing the value of $\theta$ observed by the angle detector with the target angle ($\theta_c$).

Figure 3:
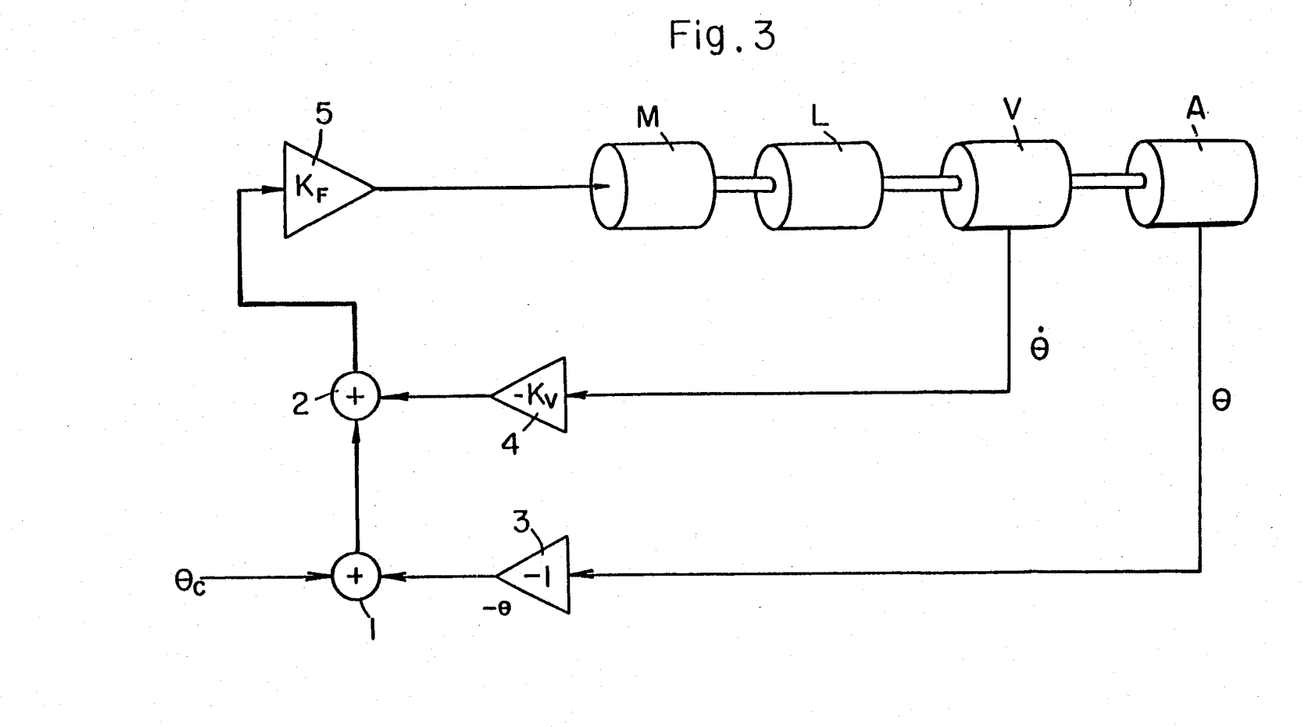
FIG. 3 shows a block diagram of a servo-drive circuit in conventional control system.

FIG. 3 is a block diagram of a servo-drive circuit. Motor M drives load L. An angle detector A provides a signal indicative of load angle $\theta$ and a velocity detector V provides a signal indicative of the derivative $\dot{\theta}$ of the load angle.

A proportional amplifier 3 is utilized to convert signal $\theta$ to $-\theta$. An adder 1 adds $-\theta$ to $\theta_c$ representing the target angle of the load. A proportional amplifier 4 multiplies (d$\theta$/dt), obtained from a velocity detector (V), by the velocity coefficient ($-K_V$), and an adder 2 adds ($\theta_c = \theta$) to the resistance to motion, that is, the product of $-K_V$ and (d$\theta$/dt). A proportional amplifier 5 determines the product of the feedback coefficient ($K_F$) and [($\theta_c - \theta$) $- K_V \cdot$(d$\theta$/dt)] and thus $i_R$ is given in equation 4:

$$i_R = K_F\left(\theta_c - \theta - K_V \cdot \frac{d\theta}{dt}\right) \qquad (4)$$

Equation of motion 5 is derived from equations 1, 2, and 4:

$$\frac{d^2\theta}{dT^2} + 2D \cdot \frac{d\theta}{dT} + \theta = \theta_c \qquad (5)$$

where:

$$\Omega_0 = \sqrt{\frac{K_T \cdot K_F}{J}} \qquad (6)$$

$$D = \frac{K_V}{2}\sqrt{\frac{K_T \cdot K_F}{J}} \qquad (7)$$

$$T = \Omega_0 \cdot t \qquad (8)$$

where $\Omega_0$ is a time coefficient.

Figure 4:
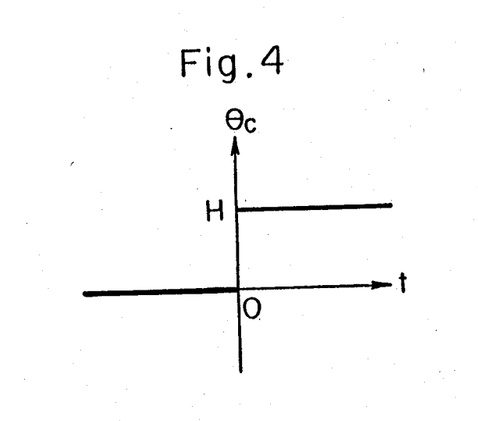
FIG. 4 illustrates an example of $\theta_c$ given as a step signal.

FIG. 4 illustrates an example wherein $\theta$ is a step signal having a height H and having a leading edge a time T=0.

Figure 5:
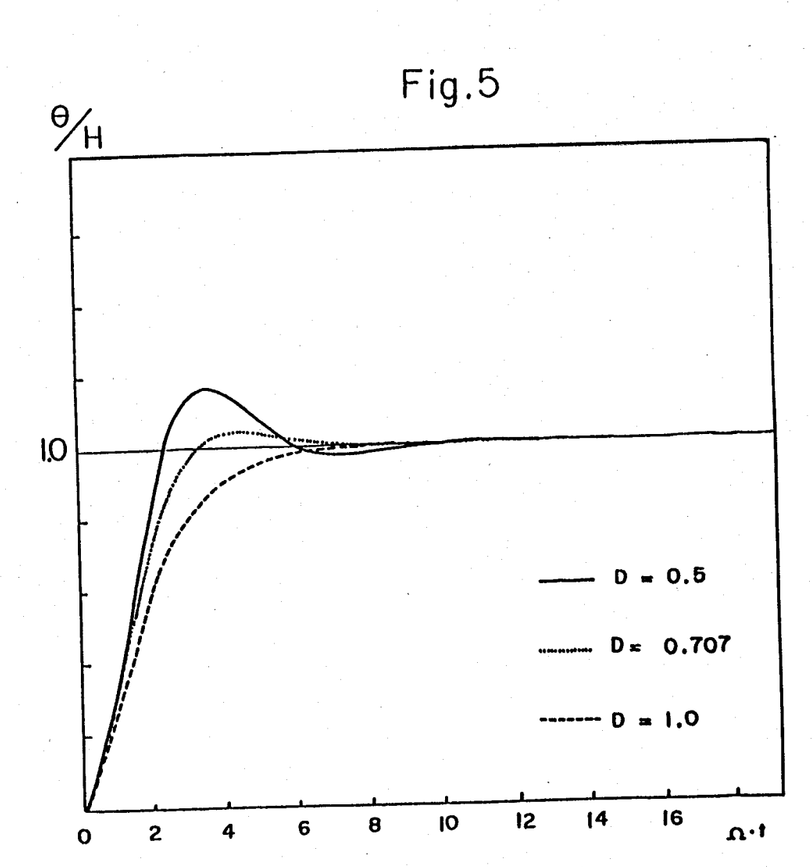
FIG. 5 shows a step-signal response of the conventional positioning system, that is, shift of $\theta$ vs. time ($\Omega \cdot t$) controlled according to equation 5.

FIG. 5 shows a step-signal response, that is, shift of $\theta$ ov. time (T) according to equation 5. In the figure, D represents the brake coefficient, and three typical values, 1.0, 0.707, and 0.5, are shown. When D is small, the load passes far beyond the commanded angle ($\theta_c$) and merges to the value ultimately after several fluctuations.

When D is large, $\theta$ does not exceed $\theta_c$. However, it is not likely that $\theta$ approaches $\theta_c$ in a short period of time. The most optimum approach of $\theta$ to the commanded value ($\theta_c$) will be achieved when D=1.0. When D=0.707, it allows a small amount of passage of $\theta$ beyond $\theta_c$. The value of D can be selected as described depending on the conditions of approach of $\theta$ to the desired commanded value ($\theta_c$). Thus, velocity coefficient ($K_V$) and feedback coefficient ($K_F$) can be determined in order to give the D value which is most preferable under the circumstances given.

In equation 7, $K_T$ and J are determined when a motor and load are specified. However, the values of $K_V$ and $K_F$ cannot be determined even when $K_T$, J, and D are specified. Thus, another factor becomes necessary to determine the values of $K_V$ and $K_F$. A concept of "stiffness" of the servomechanical control has been introduced. Stiffness (S) is defined in equation 9:

$$S = t_s/(\theta_c - \theta) \qquad (9)$$

where $t_s$ is the force necessary to hold the load at a constant position of $\theta$ from $\theta_c$ when the load is subjected to a constant external force. It is obvious that the higher the degree of stiffness, the closer the load can be held to the commanded position. From equations 1 and 4, S can be expressed as in equation 10:

$$S = K_F K_T \quad (10)$$

To obtain a high degree of stiffness, feedback coefficient ($K_F$) of the system must be large. However, an increase of $K_F$ causes an increase of the rotor current of the motor and tends to exceed the motor's rated current. Thus, the feedback coefficient ($K_F$) and, consequently, the stiffness (S) of the system are limited by the maximum allowable electric current of the motor. Although it had been tried to use a limiter to avoid exceeding the rated current of the motor, it had been found that doing so reduced the current for braking, and that the load thus moved beyond the commanded angle and took longer to converge. Generally, DC servomotors for driving robot links are required to be compact and light in weight and responsive to requirements. Moreover, a high degree of stiffness, that is, capability to hold the load firmly at the determined position, is also a requisite of servomotors in a control system. The above requirements must be met when selecting the optimum servomotor for a control system.

SUMMARY OF THE INVENTION

Accordingly, it is an object of the present invention to provide a servo system including a compact, lightweight servomotor having a small rated current, which system has a high degree of stiffness. This is accomplished by providing in the control arrangement a limiter thereby enabling use of a feedback coefficient sufficiently large to maintain positioning accuracy and a short response time. This has been achieved by regulating the rotor current by using a brake term proportional to the square of the velocity of the load or proportional to the differential of the angle of the load.

DETAILED DESCRIPTION OF THE PREFERRED EMBODIMENT

A limiter circuit is incorporated into the control arrangement in order to regulate the maximum allowable rotor current of the motor. To achieve a high degree of stiffness, the feedback coefficient ($K_F$) is maintained as large as practicable and the electric current supplied to the rotor ($i_R$) is controlled within $\pm I_{Rmax}$ (wherein $I_{Rmax}$ is maximum allowable rotor current).

Figure 6:
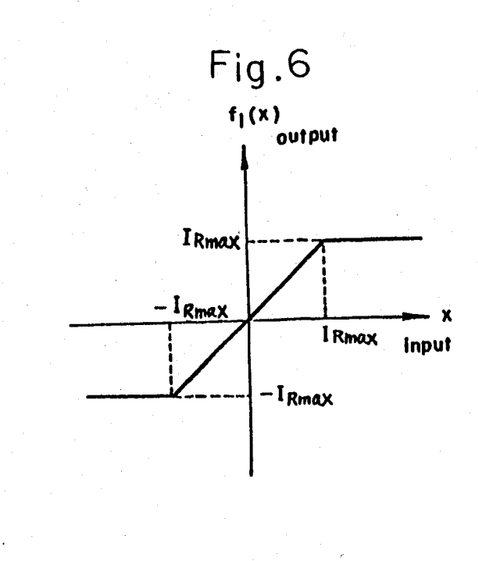
FIG. 6 shows the input/output characteristics of the limiter current of the servomotor of the present invention.

FIG. 6 shows the relation between input current (x) and output current, $f_1(x)$, of limiter. The input (x) is given according to equation 4, and the corresponding output current is $f_1(x)$. The limiter function, $f_1(x)$, is defined as in equation 11:

$$f_1(x) = \begin{cases} I_{Rmax} & \text{where } I_{Rmax} \leq x \\ X & \text{where } -I_{Rmax} < x < I_{Rmax} \\ -I_{Rmax} & \text{where } x \leq -I_{Rmax} \end{cases} \quad (11)$$

The input current (x) is a variable and is expressed in equation 12:

$$X = K_F[(\theta_c - \theta) + (\text{brake term})] \quad (12)$$

The brake term concept in equation 12 is derived from equation 4; that is:

$$i_R = K_F\left[(\theta_c - \theta) - K_V \cdot \frac{d\theta}{dt}\right] \quad (4)$$

$$= K_F(\theta_c - \theta) - K_F \cdot K_V \cdot \frac{d\theta}{dt}$$

The present invention is characterized by inclusion of a limiter circuit and by use of a different brake term. That is, instead of using the differential of the first order of the load angle ($\theta$), the square of the differential is used.

In the present invention, the brake term is proportional to the square of the differential of $\theta$, and is represented with a negative coefficient ($-K_V$) in equation 14:

$$\text{brake term} = -K_V \cdot \frac{d\theta}{dt} \cdot \left|\frac{d\theta}{dt}\right| \quad (14)$$

Therefore, rotor current ($i_R$) is expressed as in equation 15:

$$i_R = f_1\left[K_F(\theta_c - \theta) - K_V \cdot \frac{d\theta}{dt} \cdot \left|\frac{d\theta}{dt}\right|\right] \quad (15)$$

When $i_R$ in the above equation is placed into equations 1 and 2, equation of motion 16 is obtained:

$$\frac{d^2\theta}{dT^2} = f_2\left[\theta_c - \theta - 2\Gamma \cdot \frac{d\theta}{dT} \cdot \left|\frac{d\theta}{dT}\right|\right] \quad (16)$$

$$\text{where } \Omega' = \sqrt{\frac{K_T \cdot K_F}{J}} \quad (6')$$

$$T = \Omega' \cdot t \quad (8')$$

Then, the normalized form of the limiter function, $f_2(x)$, is given as in equation 11':

$$f_2(x) = \begin{cases} I_{Rmax}/K_F & \text{where } I_{Rmax}/K_F \leq x \\ x & \text{where } |x| < I_{Rmax}/K_F \\ -I_{Rmax}/K_F & \text{where } x \leq -I_{Rmax}/K_F \end{cases} \quad (11')$$

where $\Gamma$ is defined as $$\Gamma = \frac{K_F \cdot K_T \cdot K_V}{2J} \quad (17)$$

The position-setting servo-control system of the present invention is explained in detail in the figures. The preferred embodiments of the present invention are composed of a servo-drive mechanism for determining the motor (rotor) current satisfying equation of motion 16.

Figure 7:
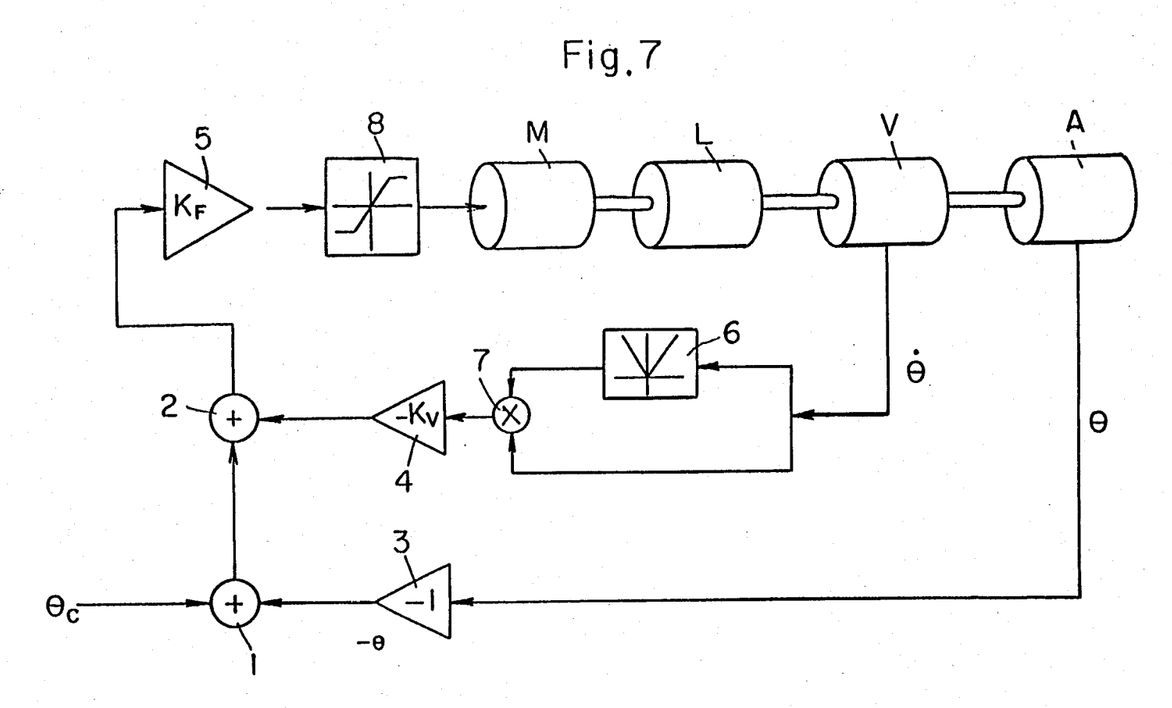
FIG. 7 shows a schematic view of a servomotor-controlled positioning system of the present invention, utilizing a velocity detector.

FIG. 7 is a schematic of the servo-control system of the present invention where the motor (M) is linked to a load (L), and an angle detector (A) and velocity detector (V) are connected to the load (L). The angle detector (A) is selected from such devices as an encoder, resolver, or potentiometer. The velocity detector (V), such as a tachometer generator, measures ($d\theta/dt$), which is then converted to its absolute value by an absolute-value determiner (6). A multiplier (7) calculates $$\frac{d\theta}{dt} \cdot \left| \frac{d\theta}{dt} \right|$$

followed by multiplication by $-K_V$ by a proportional amplifier (4). Another proportional amplifier (3) and adder (1) calculate ($\theta_c - \theta$), then another adder (2) uses the values obtained through component 4 and 1 to calculate equation 18:

$$\theta_c - \theta - K_V \cdot \frac{d\theta}{dt} \cdot \left| \frac{d\theta}{dt} \right| \quad (18)$$

Another proportional amplifier (5) calculates the product of equation 18 and the feedback coefficient ($K_F$). A limiter (8) regulates the current supplied to the rotor of the motor (M).

Figure 8:
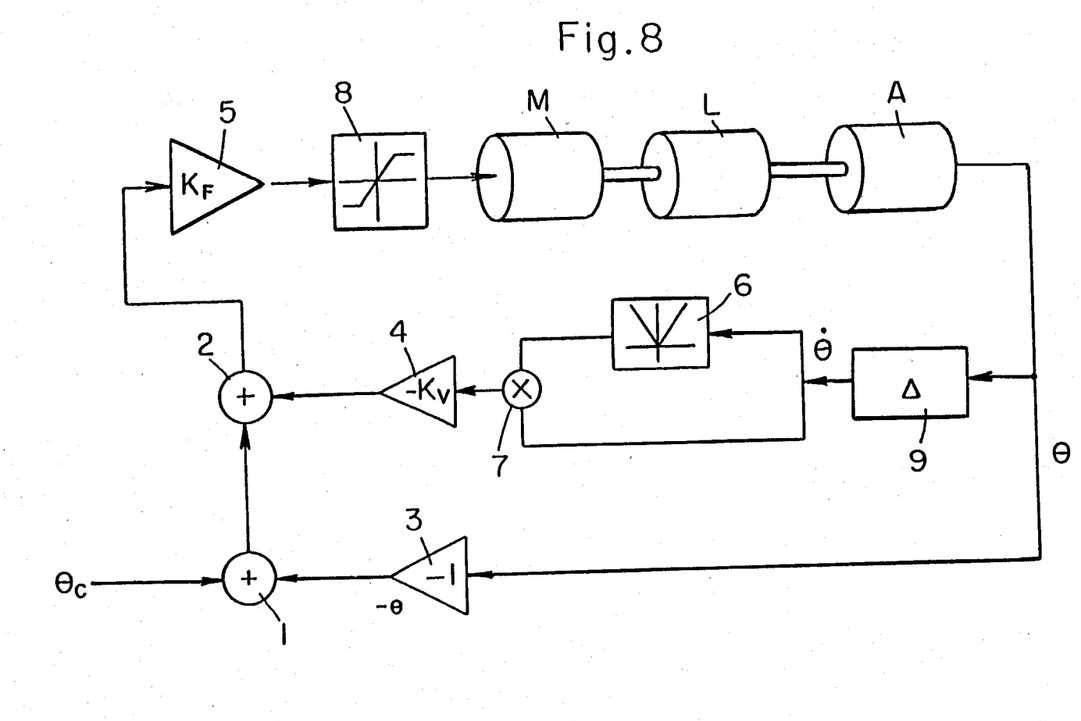
FIG. 8 is a schematic view of another embodiment of the present invention, utilizing a differentiator.

FIG. 8 is another embodiment of the servo-control system of the present invention. The difference between this and the previously described embodiment is that in this case there is no velocity detector (V). The value of ($d\theta/dt$) is obtained by a differentiator (9) from the angle signals ($\theta$) of the load observed by the angle detector (A).

As described above, the main characteristics of the servo-control system utilizing the method of the present invention are incorporation of a brake term proportional to the square of the differential of the angle ($\theta$) of the load, thus making it possible to use a limiter to keep the current supplied to the rotor within $\pm I_{Rmax}$.

By these characteristics, the position control system based on the arrangement of the present invention achieves prompt response to the command and smooth approach to the destination and, moreover, provides high degree of stiffness at the convergence of the motor even when a small, compact servomotor is used.

Figure 9:
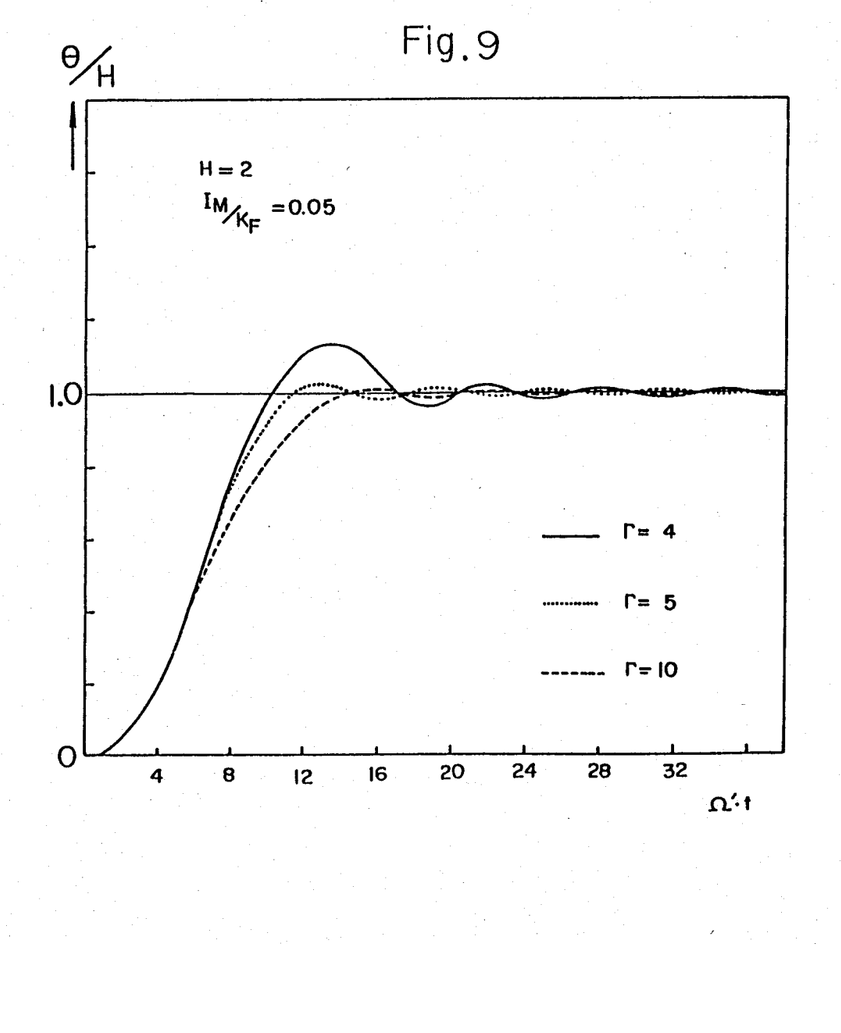
FIG. 9 illustrates the step-response of the servomotor-controlled positioning system of the present invention, that is, shift of $\theta$ vs. time ($\Omega' \cdot t$).

FIG. 9 illustrates some of the solutions of equation 16. In the figure, the step-signal (H) is equal to two radian and other conditions are described below:

$I_{rmax}/K_F = 0.05$ $\Gamma = 4, 5,$ and $10$

In FIG. 9 horizontal coordinate axis is $\Omega' \cdot t$, and the vertical coordinate axis is the normalized rotation angle of the load (L), which is expressed as $\theta/H$. It is observed that:

(a) When $\Gamma = 4$, brake action seems less effective and deviates in the positive direction or in the negative direction, passing several times across the vicinity of the commanded angle ($\theta_c$).

(b) When $\Gamma = 5$, fluctuation (overshoot) range of $\theta$ is small and converges to the commanded position gradually.

(c) When $\Gamma = 10$, convergence is prompt with a smaller range of fluctuation during the period of motion. Thus, an early and smooth convergence of the load is achieved due to the increased value of the brake coefficient ($\Gamma$). To obtain short response time, it is necessary to have a large time coefficient ($\Omega'$), and to obtain a large $\Omega'$, it is necessary to have a large feedback coefficient ($K_F$) according to equation 6'. After $K_F$ has been thus selected, the velocity coefficient ($K_V$) is selected according to equation 17 in order to obtain the desired brake coefficient ($\Gamma$).

Stiffness (S) can be increased by increasing the feedback coefficient ($K_F$) even if a servomotor is provided with fixed limiter current determined according to the rated current of the rotor. As explained in the preceding part of the specification, a larger $K_F$ can be used than usual, so higher stiffness can be obtained without difficulty. A small-sized lower power/current ratio DC servomotor is capable of providing high degree of stiffness, thus making it possible to locate the load at a predetermined position with great accuracy.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

I claim:

1. A position control arrangement comprising:
   a DC servomotor for driving a load;
   means for defining a desired load position;
   means for detecting a rotor current of said servomotor;
   means for detecting an actual positional angle of said load;
   means for detecting a rotational velocity of said load;
   means, responsive to said rotational velocity detecting means, for generating a signal related to the square of rotational velocity; and
   means, responsive to said desired load position, rotor current, actual positional angle, and square of rotational velocity signal for controlling rotor current so as to make the actual position equal to the desired position, said means including a limiter for limiting rotor current.

2. A position control arrangement comprising:
   a DC servomotor for driving a load;

means for detecting electric current in a rotor of the motor;

means for detecting the angle of the load;

means for detecting the rotational velocity $\dot\theta$ of the load; and means for controlling the rotor current of the motor by comparing the observed rotation angle of the load with the commanded rotation angle, said current controlling means comprising:

a proportional amplifier and adder for determining the difference between an observed load angle ($\theta$) and commanded angle ($\theta_c$) as $\Delta\theta = \theta_c - \theta$, an absolute-value determiner for providing the absolute value of rotational velocity, a multiplier for providing the product of $\dot\theta$ and $\dot\theta|\dot\theta|$, a proportional amplifier for providing the product of $\dot\theta|\dot\theta|$, and a velocity coefficient ($K_V$), an adder for providing $\theta_c - \theta - K_V\dot\theta|\dot\theta|$, a proportional amplifier for providing the product of the resulting value and a feedback coefficient ($K_F$), a limiter for limiting the resulting value so that its absolute value remains within the maximum rotor current ($I_{Rmax}$), and means to supply the above value as electric current to the rotor of the motor as $i_R$ so that:

$$i_R = f\{K_F(\theta_c - \theta - K_V\dot\theta|\dot\theta|)\}$$

where $$f(x) = \begin{cases} I_{Rmax} & \text{where } I_{Rmax} \leq x \\ x & \text{where } -I_{Rmax} < x < I_{Rmax} \\ -I_{Rmax} & \text{where } x \leq -I_{Rmax} \end{cases}$$

* * * * *